Patented June 6, 1939

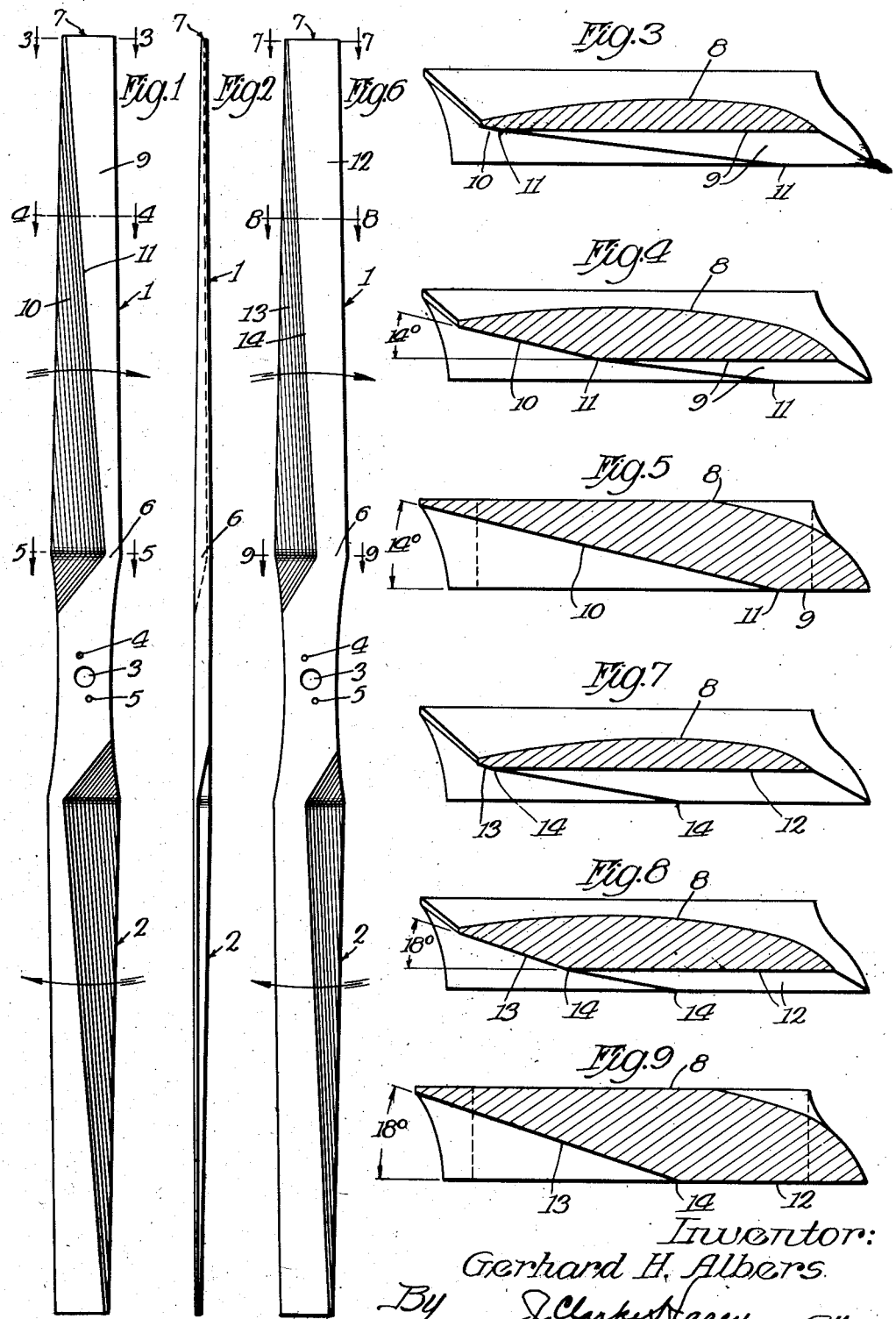

2,161,444

UNITED STATES PATENT OFFICE 2,161,444

IMPELLER FOR WIND-DRIVEN POWER APPARATUS

Gerhard H. Albers, Sioux City, Iowa, assignor to Wincharger Corporation, Sioux City, Iowa, a corporation of Minnesota Application July 7, 1938, Serial No. 217,839

13 Claims. (Cl. 170—159)

This invention relates to impellers for wind-driven power apparatus of the type used upon farms and ranches for employing the force of the wind to operate various appliances, such as pumps and electric generators for supplying current for lighting and other purposes, and more particularly concerns the construction and design of the blade or blades of what are known in the art as high-speed impellers.

The principal object of the invention is to provide an exceptionally strong blade construction for high-speed impellers capable of withstanding high wind velocities, and of such design as to start easily and operate satisfactorily under comparatively low wind velocities, thereby extending the range of varying wind conditions under which the apparatus may be safely and serviceably operated. Another and important object is to provide a light and powerful blade construction having the aforesaid desirable characteristics which is simple and inexpensive to manufacture. The manner in which these and other objects are obtained will appear from the description to follow.

In the drawing—

Figure 1 is a view in front elevation of a two-bladed high-speed impeller for wind-driven apparatus constructed according to my invention;

Figure 2 is a view in right side elevation of said impeller;

Figures 3, 4 and 5 are enlarged transverse sectional views of the impeller of Figure 1, taken, respectively, upon the section-lines 3—3, 4—4 and 5—5 of that figure;

Figure 6 is a view similar to Figure 1, showing a modification of the construction also embodying my invention; and Figures 7, 8 and 9 are enlarged transverse sectional views of the impeller of Figure 6, taken, respectively, upon the section-lines 7—7, 8—8 and 9—9 of that figure.

The use of high-speed impellers for wind-driven power apparatus may be considered as a development of the earlier use of wind-wheels for windmills, but their resemblance resides chiefly in the fact that they both fall within the loosely applied term of "windmills", which term is generally used to designate any device employing a rotary wind-driven apparatus for translating the force of the wind into mechanical motion for any purpose. Since this invention is concerned only with the construction and design of the device directly acted upon by the wind and not with any of the other associated parts of the wind-driven apparatus, I have not shown such apparatus, and I shall not attempt to describe the many types and constructions of windmill sails, wheels and wheel-blades which have been used for succeeding generations as wind-driven driving means therefor. In using the term "wind-wheel", I refer to the well known many-bladed windmill wheel as distinguishing from the type of "impeller" here concerned.

In the employment of wind-wheels, the factor of wheel-power, rather than that of wheel-speed, is what is desired, and, consequently, wind-wheels have been generally designed with many closely arranged blades to offer a large surface area to the wind. With such an arrangement, the wind-wheel may be directly connected to operate slow-speed mechanisms, or indirectly connected by means of interposed step-up gearing with higher speed mechanism, but such wind-wheels are not suitable for use in high wind velocities because of the tremendous surface pressure of the wind thereupon, and they are incapable of developing high speed ratios because of the interfering and retarding air-whirls or eddy-currents set up by each of the many closely arranged blades.

In using the term "high-speed impeller", I refer to a rotary device having a low number of radially extending blades directly acted upon and driven by the wind at high speed as compared with the velocity of the wind. Such blades are described as having a "high tip speed ratio", meaning that, when permitted to turn freely, the rotary speed of the device at the tip of each blade is many times greater than the velocity of the driving wind stream. As compared with the previously mentioned wind-wheel, the same velocity of wind will turn the high-speed impeller many times faster, and this is of course due to the difference in number, construction and design of the blades. The blades must be fewer and spaced further apart than those of the wind-wheel in order to prevent each of the blades encountering such eddy currents as may be set up in the wake of a preceding blade, and each blade should be so constructed and designed as to minimize its action in setting up such eddy-currents. In other words, each blade should be constructed and designed to slip through the air with the least disturbance or churning action, and this forms one of the most important objects of my invention.

I have found that remarkably high speed ratios may be obtained from impellers having one or a few blades, where each blade is formed with a well designed air-foil back and a perfectly flat face, that is to say, flat throughout with respect to the plane of rotation, but such impellers require starting. When such impellers attain sufficient speed to bring the air-foil into action, they quickly develop the aforesaid remarkably high speed ratio, due, I believe, to the fact that the perfectly flat face of each blade passes through the air without developing any appreciable retarding wake-suction upon that blade or setting up interfering eddy-currents in the path of the other blade or blades. I have also found that such slight variations of the flat face in the plane of rotation as might develop from use do not materially interfere with this high speed ratio.

In the construction and design of the impeller to be described, I have employed this feature of a perfectly flat face along the entire leading edge-part of the blade, gradually increasing its transverse area from hub to tip so that the face of the blade at the tip is entirely flat, or substantially so, and I have combined with such flat face for starting purposes a beveled surface, joining said flat face at a constant and pronounced angle thereto and to the plane of rotation. This beveled surface extends along the trailing edge-part of the blade, practically disappearing at the tip, providing a longitudinally extending reinforcing ridge along the full length of the blade and leaving a substantial thickness of blade where strength is most needed to withstand high wind velocities.

In the two-bladed impeller shown in Figures 1, 2 and 6, each of the oppositely extending blades 1 and 2 are exactly alike, and a description of one will suffice for both. While the two-bladed, single-unit construction is the preferred form, and is the simplest and easiest to manufacture and install in position, the invention applies to the construction and design of each blade, without regard to the number employed or the manner of their association in constructing an impeller.

In Figures 1 and 6, 3 indicates the central axial opening in the impeller which is coincident with the rotatable shaft upon which the impeller is to be mounted, and 4 and 5 indicate bolt-holes through which bolts are to be passed in securing the impeller upon said shaft. Neither the shaft nor the attaching means are shown, since they do not form a part of this invention. The shoulder of blade 1 is indicated at 6 and the tip thereof at 7. The sides of the blade are preferably tapered toward the tip, as shown, and the thickness of the blade is also preferably tapered from shoulder to tip, as shown in Figure 2. The back of the blade is shaped as an air-foil, as indicated at 8 in the several cross-sectional views constituting Figures 3 to 5 and 7 to 9, inclusive. It will be observed that this air-foil shape flattens out gradually toward the tip of the blade.

In the construction shown in Figures 1 and 3 to 5, inclusive, the flat face of the blade to which I have referred is indicated at 9, the beveled surface at 10, and the ridge defined by the juncture of face 9 and the beveled surface 10 is indicated at 11. It will be seen that the face 9 and the beveled surface 10 are both plane surfaces and their angular relationship is shown to be the same throughout the length of the blade, the ridge 11 forming a straight line from the shoulder 6 to the tip 7 thereof (Figure 1). The face 9 is at or coincident with the plane of rotation, and the beveled surface is here illustrated as formed at an angle of 14 degrees with respect to the face 9 and, of course, with respect to the plane of rotation.

In the modified construction shown in Figures 6 and 7 to 9, inclusive, the flat face of the blade is indicated at 12, the beveled surface at 13, and the ridge at 14. In this arrangement, the face 12 is flat or coincident with the plane of rotation, but the beveled surface is formed at an angle of 18 degrees and does not cut so far into the flat face at any point along the blade.

In both of these constructions, the diagonal direction of the ridge upon the face of the blade is caused by the tapering thickness of the blade. To keep the trailing edge of the blade of uniform thickness from shoulder to tip, the beveled surface is cut with the back of the blade as a gauge and, as the flat face is the front surface of the blade, the width of the beveled surface is reduced thereby as the thickness of the blade tapers toward the tip. The starting force of the wind upon the blade therefore decreases proportionately as the blade-leverage increases with its length. This is, I believe, in accordance with the best practice, but obviously the beveled surface need not be carried out so far if greater thickness and strength should be desired at the outer reaches of the blade, and I wish not to be limited in this respect to the exact forms and proportions I have shown.

Now, whether the construction be according to Figure 1 or Figure 6, when the impeller is rotatably supported to face the wind, the action of the wind upon the beveled surface will start the rotation of the impeller in a clockwise direction and the flat face will neither assist nor interfere with such starting. The blade construction which I have described then enables the impeller to attain a relatively high speed ratio. While the starting effect of a 14 degree angle of greater surface area may be closely similar to that of an 18 degree angle of less surface area, at the higher rotative speeds the retarding action of the latter is greater. Consequently, while the impeller of Figure 6 may start as easily as the impeller of Figure 1, it will not develop such a high speed ratio. It will thus be seen that the angle to be given the beveled surface is more or less a matter of preference, depending upon the performance desired. Obviously, these angles may be varied, the present angles of 14 and 18 degrees being used here for illustration.

Heretofore, all high-speed impeller-blades with which I am acquainted have been designed with an axial twist and, while they may have been designed more or less scientifically, it is easily seen that such shaping of the blades is difficult and expensive to manufacture. In the construction and design here shown and described, there is no axial blade-twist: the faces 9 and 10 are flat and therefore easily milled and finished, so that an impeller-blade constructed according to my invention may be manufactured at a fraction of the cost of a helical or twisted blade. Furthermore, the impeller I have invented is capable of a high speed ratio, is exceptionally strong where strength is needed to prevent flexing and fluttering at high speeds, and will withstand much higher wind velocities without damage.

In the following claims, where I employ the term "relatively high angle", I refer to an angle in excess of approximately 12 degrees, and preferably from about 12 to 20 degrees, it being understood, however, that my invention, in its broader aspects, is not limited to any specific angle.

I claim—

1. In a rotatable impeller for wind-driven power apparatus, a radially extending blade formed with two flat surfaces upon the front face thereof adjoining each other lengthwise of the blade, one of said surfaces extending in a continuously flat plane substantially coincident with the plane of rotation of said impeller and increasing in width toward the tip of said blade, and the other of said surfaces extending in a plane having a relatively high angle to said plane of rotation and decreasing in width toward the tip of said blade.

2. In a rotatable impeller for wind-driven power apparatus, a radially extending blade formed with two flat surfaces upon the front face thereof adjoining each other lengthwise of the blade, one of said surfaces extending in a continuously flat plane substantially coincident with the plane of rotation of said impeller and increasing in width toward the tip of of said blade, and the other of said surfaces extending in a continuously flat plane having an angle between 12 and 20 degrees to said plane of rotation and decreasing in width toward the tip of said blade.

3. In a rotatable impeller for wind-driven power apparatus, a radially extending blade formed with two flat surfaces upon the front face thereof adjoining each other lengthwise of the blade, one of said surfaces extending in a continuously flat plane substantially coincident with the plane of rotation of said impeller and increasing in width toward the tip of said blade, and the other of said surfaces extending in a continuously flat plane having an angle of substantially 14 degrees to said plane of rotation and decreasing in width toward the tip of said blade.

4. In a rotatable impeller for wind-driven power apparatus, a radially extending blade formed with two flat surfaces upon the front face thereof adjoining each other lengthwise of the blade, one of said surfaces extending along the leading edge-part of said blade in a continuously flat plane substantially coincident with the plane of rotation of said impeller and increasing in width toward the tip of said blade, and the other of said surfaces extending along the trailing edge-part of said blade in a continuously flat plane having a relatively high angle to said plane of rotation and decreasing in width toward the tip of said blade.

5. In a rotatable impeller for wind-driven power apparatus, a radially extending blade formed with two flat surfaces upon the front face thereof adjoining each other lengthwise of the blade, one of said surfaces extending in a continuously flat plane substantially coincident with the plane of rotation of said impeller and increasing in width toward the tip of said blade, and the other of said surfaces extending in a continuously flat plane having a relatively high angle to said one of said surfaces and decreasing in width toward the tip of said blade, the juncture of said two surfaces forming a ridge upon the front face of said blade extending substantially the entire length thereof.

6. In a rotatable impeller for wind-driven power apparatus, a radially extending blade formed with two flat surfaces upon the front face thereof adjoining each other lengthwise of the blade and with a curved rear face constituting an air-foil, one of said surfaces extending along the leading edge-part of said blade in a continuously flat plane substantially coincident with the plane of rotation of said impeller and increasing in width toward the tip of said blade, and the other of said surfaces extending along the trailing edge-part of said blade in a continuously flat plane having a relatively high angle to the plane of said one of said surfaces and decreasing in width toward the tip of said blade.

7. In a rotatable impeller for wind-driven power apparatus, a radially extending blade having the front face thereof formed with two flat surfaces and the rear face thereof curved to form an air-foil, said two flat surfaces adjoining each other lengthwise of said blade, one of said surfaces extending in a continuously flat plane substantially coincident with the plane of rotation of said impeller and increasing in width toward the tip of said blade, and the other of said surfaces extending in a continuously flat plane having a relatively high angle to said plane of rotation and decreasing in width toward the tip of said blade.

8. In a rotatable impeller for wind-driven apparatus, a radially extending blade comprising a shoulder, a tip, and leading and trailing edges, and tapering in thickness along the leading edge from shoulder to tip, said blade having a flat surface forming the front face thereof extending from shoulder to tip in a continuously flat plane substantially coincident with the plane of rotation of said impeller, having the trailing edge thereof of substantially uniform thickness from shoulder to tip, and having a beveled surface extending lengthwise of said blade in a continuously flat plane and from the trailing edge thereof inwardly upon the face of said blade to join with the aforesaid flat surface forming the front face of said blade the juncture of said flat and beveled surfaces forming a straight ridge along the front face of said blade oblique to the longitudinal axis thereof.

9. In a rotatable impeller for wind-driven power apparatus, a radially extending blade formed with two flat surfaces upon the front face thereof, said surfaces extending in continuously flat planes angular with respect to each other and joining to form a straight ridge obliquely crossing the longitudinal axis of said blade.

10. In a rotatable impeller for wind-driven power apparatus, a radially extending blade comprising leading and trailing edges and formed with two straight flat surfaces upon the front face thereof, one of said surfaces extending from the leading edge of said blade and increasing in area to the tip thereof in a plane substantially coincident with the plane of rotation of said impeller, and the other of said surfaces extending from the first-named surface and receding therefrom to the trailing edge of said blade in a plane angular to said plane of rotation.

11. In a rotatable impeller for wind-driven power apparatus, a radially extending blade comprising leading and trailing edges and formed with two straight flat surfaces upon the front face thereof adjoining each other lengthwise of the blade, one of said surfaces extending from the leading edge of said blade and increasing in area to the tip thereof in a continuously flat plane substantially coincident with the plane of rotation of said impeller, and the other of said surfaces extending in a plane at an angle in excess of 12 degrees to said plane of rotation receding from its juncture with the first-named surface, decreasing in area toward the tip of said blade, and substantially disappearing at said tip.

12. In a rotatable impeller for wind-driven power apparatus, a radially extending blade formed with two straight flat surfaces upon the front face thereof adjoining each other lengthwise of the blade, said surfaces extending in planes angular with respect to each other, the plane of one of said surfaces being substantially coincident with the plane of rotation of said impeller and constituting substantially the entire front face of said blade at the tip thereof.

13. In a rotatable impeller for wind-driven power apparatus, a radially extending blade formed with two straight flat surfaces upon the front face thereof adjoining each other lengthwise of the blade and with the rear face of said blade curved to form an air-foil, said flat surfaces extending in planes angular with respect to each other the plane of one of said surfaces being substantially coincident with the plane of rotation of said impeller and progressively increasing in area to constitute substantially the entire front face of said blade at the tip thereof.

GERHARD H. ALBERS.